United States Patent [19]

Donahue

[11] Patent Number: 5,692,108
[45] Date of Patent: Nov. 25, 1997

[54] ODD/EVEN STROKE CONTROL FOR REDUCED VIDEO DATA CLOCKING

[75] Inventor: Frederick A. Donahue, Walworth, N.Y.

[73] Assignee: Xerox Corporation, Stamford, Conn.

[21] Appl. No.: 312,382

[22] Filed: Sep. 26, 1994

[51] Int. Cl.$^6$ ................................................ G06K 15/00
[52] U.S. Cl. ........................... 395/108; 347/12; 347/41;
347/40; 358/502; 358/538
[58] Field of Search .......................... 395/108, 110,
395/109, 101; 347/9, 16, 15, 14, 12, 41,
40, 37; 346/104; 358/502, 298, 456, 538

[56] References Cited

U.S. PATENT DOCUMENTS

| | | | |
|---|---|---|---|
| 4,464,669 | 8/1984 | Sekiya | 347/195 |
| 4,674,895 | 6/1987 | Tanaka et al. | 395/110 |
| 4,748,453 | 5/1988 | Lin et al. | 346/1.1 |
| 4,965,593 | 10/1990 | Hickman | 347/12 |
| 4,967,203 | 10/1990 | Doan et al. | 346/1.1 |
| 5,012,257 | 4/1991 | Lowe et al. | 346/1.1 |
| 5,149,212 | 9/1992 | Murakami | 400/121 |
| 5,155,503 | 10/1992 | Tasaki et al. | 346/140 |
| 5,233,366 | 8/1993 | Stephany | 346/1.1 |
| 5,237,344 | 8/1993 | Tasaki et al. | 346/140 |
| 5,353,387 | 10/1994 | Petschik et al. | 395/108 |
| 5,506,609 | 4/1996 | Claassen et al. | 347/41 |

FOREIGN PATENT DOCUMENTS

61-8360  1/1986  Japan ................... B41J 3/04

Primary Examiner—Dwayne Bost
Assistant Examiner—Tracy M. Legree
Attorney, Agent, or Firm—Daniel J. Krieger

[57] ABSTRACT

A method and apparatus for checkerboard printing by a liquid ink printing apparatus. A liquid ink printing apparatus, such as a thermal ink jet printer, includes circuitry for reducing video data clocking in checkerboard printing by controlling the odd and even vertical print strokes of a reciprocating printhead mounted to a scanning carriage. The amount of bitmapped imaged data, also known as video data, is reduced by one half or more and sent to the printhead for printing checkerboard patterns. Reduction of the bitmapped image data is accomplished by a data packer circuit which selects certain bits of the bitmapped image data for printing by the printhead in a checkerboard pattern. At the printhead, the bitmapped image is reconstructed by a data unpacker circuit to cause selective ejection of ink from the appropriate nozzles of the printhead. Two or more passes information are printed to complete printing of the bitmapped image data.

28 Claims, 8 Drawing Sheets

| CONTROL LINE #1 | CONTROL LINE #2 | FUNCTION |
|---|---|---|
| 0 | 0 | SOLID SINGLE PASS PRINTING |
| 0 | 1 | FIRST 1/3 PRINTING (JETS #1,4,7,10,....) |
| 1 | 0 | SECOND 1/3 PRINTING (JETS #2,5,8,11,....) |
| 1 | 1 | THIRD 1/3 PRINTING (JETS #3,6,9,12,....) |

ODD/EVEN STROKE CONTROL FOR REDUCED VIDEO DATA CLOCKING

FIELD OF THE INVENTION

This invention relates generally to a liquid ink printing apparatus and more particularly go a method and apparatus for reducing the data rate to liquid ink jet print elements when printing in a checkerboard or gray tone mode.

BACKGROUND OF THE INVENTION

An ink jet printer of the type referred generally to as a drop-on-demand printer has at least one printhead from which droplets of ink are directed toward a recording medium. Within the printhead, the ink is contained in a plurality of channels in which energy pulses are used to cause the droplets of ink to be expelled, as required, from orifices or nozzles at the end of the channels.

In a thermal ink jet printer, the energy pulses are usually produced by resistors, each located in a respective one of the channels and individually addressable by current pulses to heat and vaporize ink in the channels. A thermal energy generator, usually a resistor or a heater, is located in each of the channels, a predetermined distance from the nozzles. The resistors are individually addressed with a current pulse to momentarily vaporize the ink thereby forming a bubble which expels an ink droplet. As the bubble grows, the ink which bulges from the nozzles is contained by the surface tension of the ink as a meniscus. As the bubble begins to collapse, the ink remaining in the channel between the nozzle and the bubble moves towards the collapsing bubble causing a volumetric contraction of the ink at the nozzle resulting in the separation of the bulging ink as a droplet. The acceleration of the ink out of the nozzle while the bubble is growing provides the momentum and velocity of the droplet in a substantially straight line direction towards the recording medium. The droplet of ink lands on the recording medium and forms an ink spot. Because the droplet of ink is emitted only when the resistor is actuated, this type of ink jet printing is known as drop-on-demand printing. The channel is then refilled with ink by capillary action which, in turn, draws ink from a supply container. Operation of a thermal ink jet printer is described in, for example, U.S. Pat. No. 4,849,774.

One particular form of ink jet printer is described in U.S. Pat. No. 4,638,337. The described printer is of the carriage type and has a plurality of printheads each having its own supply cartridge mounted on a reciprocating carriage. The nozzles in each printhead are aligned perpendicularly to the line of movement of the carriage and a swath of information is printed on the stationary recording medium as the carriage is moved in one direction. The recording medium is then stepped perpendicularly to the line of carriage movement by a distance equal to the width of the printed swath. The carriage is then moved in the reverse direction to print another swath of information. Full width or page width linear arrays in which the sheet is moved past a linear array of nozzles extending across the full width of the sheet, are also known.

In current practical embodiments of drop-on-demand ink jet printers, it has been found that such printers print most effectively when the spots of liquid ink are deposited on a recording medium, such as paper or a transparency, so as to prevent the flow of liquid ink from one spot of liquid ink to an adjacent spot of liquid ink. To prevent the flow of liquid ink from one spot to another, ink jet printers print a line or a swath of information in at least two passes of the printhead, one overlapping the other. A first pass prints diagonally adjacent pixel areas so that there is no overlap of ink spots from adjacent pixel areas when the ink is still in a flowable state. A second pass deposits the remaining diagonally adjacent pixel areas in either a reverse or a same direction. This type of printing is typically called checkerboard printing and is enabled by firing the odd numbered jets in the odd numbered vertical strokes and the even numbered jets in the even numbered vertical strokes during one of the passes. During the other pass, the complementary jets are fired i.e. even numbered jets within the odd number vertical strokes and the odd numbered jets within the even numbered vertical strokes. After two passes of the printhead, 100% coverage of the printed swath is achieved. By printing checkerboard patterns, the first pass of liquid ink droplets dries for a period of time before the second pass of liquid ink droplets is deposited. By providing a certain amount of time for drying, certain advantages are achieved, which include, enhancing the optical density of printing, reducing intercolor bleed, and reducing the cockle and curl of the paper due to the deposition of liquid ink droplets.

While checkerboard printing improves the quality of the final printed image, checkerboard printing suffers from the fact that instead of taking one pass to print a swath of information, now two passes or more, of the carriage are required to print the same swath of information. At slow print speeds, there is little adverse impact on marking speed which is limited by the amount of time it takes to eject ink from a nozzle. There is, however, a need to double the traversal speed or carriage pass speed of each pass to equal the throughput of a single pass approach. As resolutions and prints speeds, however, increase, the data rate to the printhead becomes high which could adversely impact printhead operation and printer apparatus design. For example, an 8.5"×11", 300×300 dot per inch 4 page per minute printer requires data rates of about 561 kilobits per second. An 8.5"×11"600×600 dot per inch, 8 page per minute printer, however, requires data rates of about 4488 kilobits per second. Consequently, it is desirable to reduce the data rate to the printhead when printing in a checkerboard mode if higher print speeds are desired.

Various ink jet printers and methods for depositing ink on a recording medium are illustrated and described in the following disclosures which may be relevant to certain aspects of the present invention.

U.S. Pat. No. 4,748,453 to Lin et al. describes a method of depositing spots of liquid ink on a substrate to prevent the flow of liquid ink from one spot which overlaps an adjacent spot. A first checkerboard pattern having only diagonally adjacent pixel areas is deposited in a first pass. In a second pass, the complementary checkerboard pattern is deposited. Ink is not deposited on horizontally and vertically adjacent pixel areas during the single passes, since the spots on these adjacent areas have overlapping portions.

U.S. Pat. No. 4,965,593 to Hickman describes an ink jet printer having a printhead in which the ink jet nozzles are spaced by an amount greater than the pixel spacing of the printing medium. The printer operates in a manner such that adjacent pixels are not printed until the deposited colors have time to dry.

U.S. Pat. No. 4,967,203 to Doan et al. describes an interlace printing process for printing of images upon a print medium using an ink jet printer A sequence of depositing droplets of ink upon the medium is disclosed which provides a means for reducing unwanted bleeding of colors between contiguous pixel locations or groups of pixel locations.

U.S. Pat. No. 5,012,257 to Lowe et al. describes an ink jet color printing system for printing super pixel configurations so that drops of colored ink are deposited only in a diagonally adjacent pair of cells with no more than two drops of ink per cell and no more than three drops of ink per super pixel.

U.S. Pat. No. 5,149,212 to Murakami describes a dot printer having a changeable quality dot pattern. A reference dot pattern is produced by replicating n vertical lines of the same dot arrangement as that of the dot lines of the basic dot pattern. The controller of the printer produces the printing dot pattern by omitting m dots following the head dot of each dot line and each successive remaining dot, of the reference dot pattern consisting of successive dots.

U.S. Pat. No. 5,155,503 to Tasaki et al. describes an ink jet recording apparatus with detection of environmental conditions used to control a dot thinning rate. Print dots are thinned based upon a printing mode or the printing dot density of the characters.

U.S. Pat. No. 5,233,366 to Stephany describes half-tone printing with a thermal ink jet printer using random spot distribution in one dimension. The individual ink ejectors of the printhead for the ink jet printer are operated according to a probability function which controls the frequency of a random activation of the ejectors as the print medium or sheet moves past the ejectors.

U.S. Pat. No. 5,237,344 to Tasaki et al. describes an ink jet recording apparatus and method with dot thinning. This reference is related to U.S. Pat. No. 5,155,503.

SUMMARY OF THE INVENTION

In accordance with one aspect of the invention, there is provided a printing apparatus having a printhead with a plurality of nozzles for printing an image on a recording medium according to a bitmap of image data having rows and columns. The printing apparatus includes selecting means for selecting a portion of the bitmap of image data with the portion selected having selected bits and unselected bits and directing means, in communication with said selecting means, for directing the printhead to emit liquid ink from selected ones of the plurality of nozzles according to the selected bits.

A further aspect of the invention is to provide a method for printing an image on a recording medium with a printhead having a plurality of nozzles according to a bitmap of image data having rows and columns. The method includes selecting a portion of the bitmap of image data with the portion selected having selected bits and unselected bits, transferring the selected bits only in a serial fashion and directing the printhead to emit liquid ink from selected ones of the nozzles according to the selected bits.

An additional aspect of the invention is to provide a printing apparatus having a printhead with a plurality of drivers for causing ink to be ejected from nozzles to print an image on a recording medium according to a bitmap of image data having rows and columns. The printing apparatus includes an electronic selection circuit receiving a selected portion of the bitmap of image data and outputting selected bits of the selected portion, an electronic transfer circuit coupled to the electronic selection circuit receiving the selected bits of the selected portion and outputting the selected bits of the selected portion, and an electronic control circuit coupled to the electronic transfer circuit for receiving the selected bits of the selected portion and outputting the selected bits to selected drivers of the printhead.

BRIEF DESCRIPTION OF THE DRAWINGS

Other features of the present invention will become apparent as the following description proceeds and upon reference to the drawings, in which.

While the present invention will be described in connection with a preferred embodiment and method of use thereof, it will be understood that it is not intended to limit the invention to that embodiment and method of use. On the contrary, it is intended to cover all alternatives, modifications, and equivalents as may be included within the spirit and scope of the invention as defined by the appended claims.

DETAILED DESCRIPTION OF THE INVENTION

Figure 8:
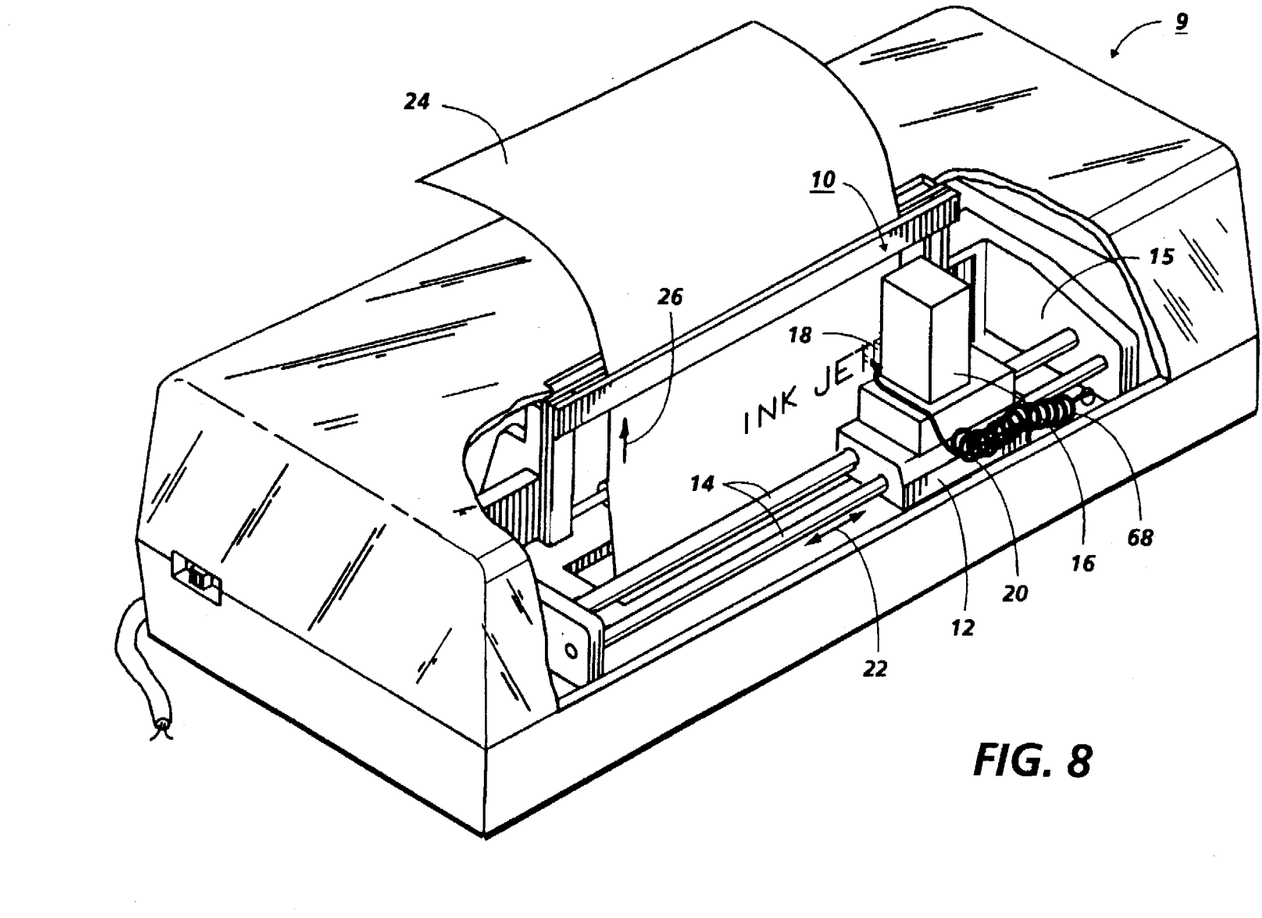
FIG. 8 is a cutaway view of a printer utilizing thermal ink jet printheads attached to a reciprocating carriage.

FIG. 8 illustrates a perspective view of an ink jet printer 9 having an ink jet printhead cartridge 10 mounted on a carriage 12 supported by carriage rails 14. The carriage rails 14 are supported by a frame 15 of the ink jet printer 9. The printhead cartridge 10 includes a housing 16 containing ink for supply to a thermal ink jet printhead 18 which selectively expels droplets of ink under control of electrical signals received from a controller of the printer 9 through an electrical cable 20. The printhead 18 contains a plurality of ink channels (not shown) which carry ink from the housing 16 to respective ink ejecting orifices or nozzles (also not shown). When printing, the carriage 12 reciprocates or scans back and forth along the carriage rails 14 in the direction of the arrow 22. As the printhead cartridge 10 reciprocates back and forth across a recording medium 24, such as a sheet of paper or a transparency, droplets of ink are expelled from selected ones of the printhead nozzles towards the sheet of paper. The ink ejecting orifices or nozzles are typically arranged in a linear array perpendicular to the scanning direction 22. During each pass of the carriage 12, the recording medium 24 is held in a stationary position. At the end of each pass, however, the recording medium is stepped in the direction of the arrow 26. For a more detailed explanation of the printhead and printing thereby refer to U.S. Pat. No. 4,571,599 and U.S. Pat. No. Re. 32,572, the relevant portions of which are incorporated herein by reference.

Figure 9:
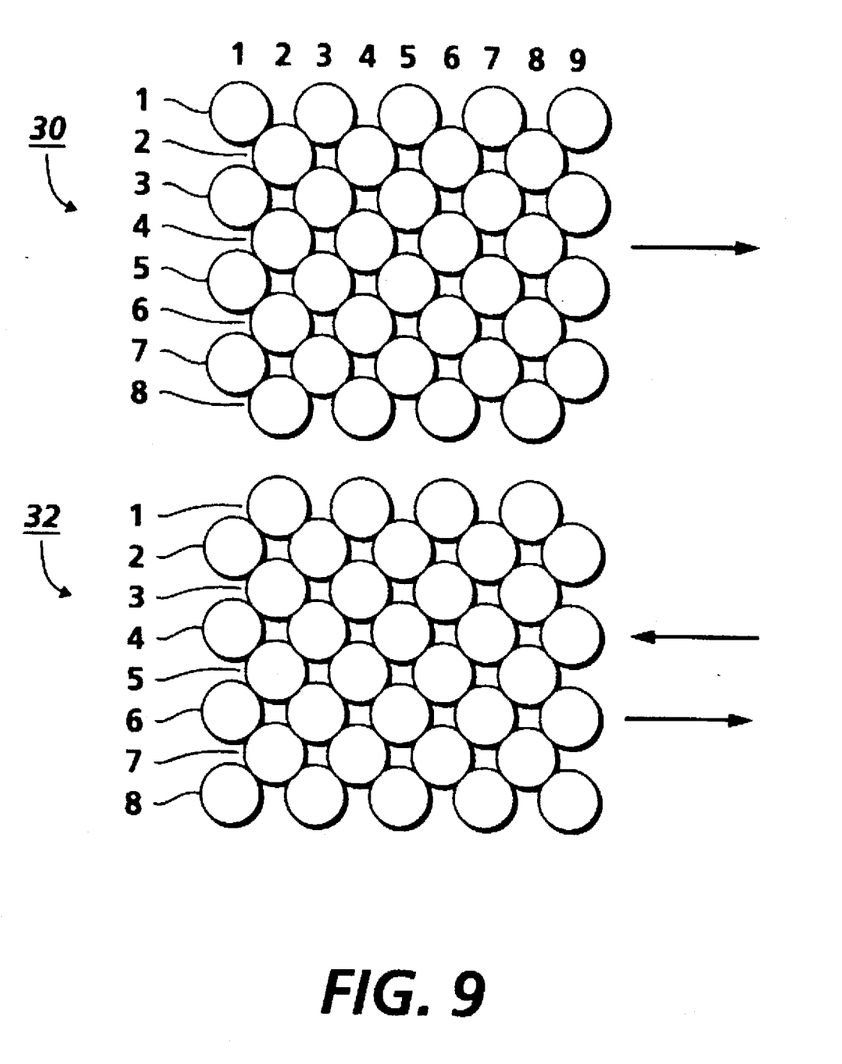
FIG. 9 is an enlarged schematic illustration of two passes of checkerboard printing.

In single pass printing, a swath of information having a height which is equal to the height of the linear array of nozzles is printed while the recording medium 24 is held stationary. Once the swath of information is printed, the recording medium 24 is stepped a distance equal to a height of the linear array of nozzles so that a second adjacent swath of information can be printed. Single pass printing, however, can lead to various print problems. To overcome these problems, a swath of information can be printed in a first pass of information 30 and a second pass of information 32 as illustrated in FIG. 9. Each pass consists of a checkerboard pattern in which dots are alternately printed in both the horizontal and vertical directions so that spaces remain between dots deposited in a column and dots deposited in a row. For instance, as shown in FIG. 9, the first pass 30, as illustrated, consists of nine columns and eight rows of dots, the number of columns and rows is variable, however. The first pass 30 is printed by firing only the odd numbered jets in the odd numbered strokes here shown as vertical columns 1, 3, 5, and 7 and firing the even numbered jets in the even numbered jets in the even numbered strokes or columns 2, 4, 6 and 8. During the second pass 32, the complementary jets are fired as shown in which only the even numbered jets within the odd numbered strokes or columns 1, 3, 5, and 7 are fired and only the odd numbered jets in the even numbered strokes 2, 4, 6 and 8 are fired, thus, achieving 100% coverage of the printed swath. It is also possible to offset the second pass 32 from the first pass 30 by a number of rows so that banding is reduced or prevented. U.S. Pat. No. 4,748,453 to Lin et al. describes the deposition of liquid ink in checkerboard patterns in more detail and is herein incorporated by reference.

In known checkerboard printing, bitmapped imaged data received from a computer or some other source of information is received by the liquid ink printing apparatus. Bitmapped imaged data typically exists as a 2-dimensional array of individual bits (either 1s or 0s) which indicate whether or not a spot of ink should be deposited at the location of the bit in the bitmap. Typically, if a bit is a 1, it indicates that a spot of ink should be deposited and if a bit is 0 it indicates that no spot of ink should be deposited in that location.

A mask is applied to the bitmap to force selected bits of the bitmap to zero in a checkerboard fashion so that when printed no ink is deposited where bits are forced to zero. A vertical slice of the bitmapped image data which has been masked is extracted from the bitmap, the vertical slice typically having a vertical height equal to the number, N, of nozzles in the linear array of nozzles and having a width of 1-bit wide. Each bit of the vertical slice including the bits which were forced to white (zero) is then shipped serially to the printhead for firing each of the nozzles. Parallel shipping of data can also be used, however, serializing the data reduces interconnect and printhead wire bond counts. At the next horizontal bit location, a second adjacent vertical slice of the masked bitmapped imaged data is extracted. Again, this data is shipped serially to a print element for firing each of the nozzles of the printhead. Printing of each vertical slice in a swath is completed until a single pass is completed. After completion, the complementary pass is printed vertical slice by vertical slice.

It is also possible to extract a horizontal slice of the bitmapped image data, for instance, when printing with a pagewidth printbar having a linear array of nozzles aligned perpendicularly to the stepping direction of the recording medium.

Figure 1:
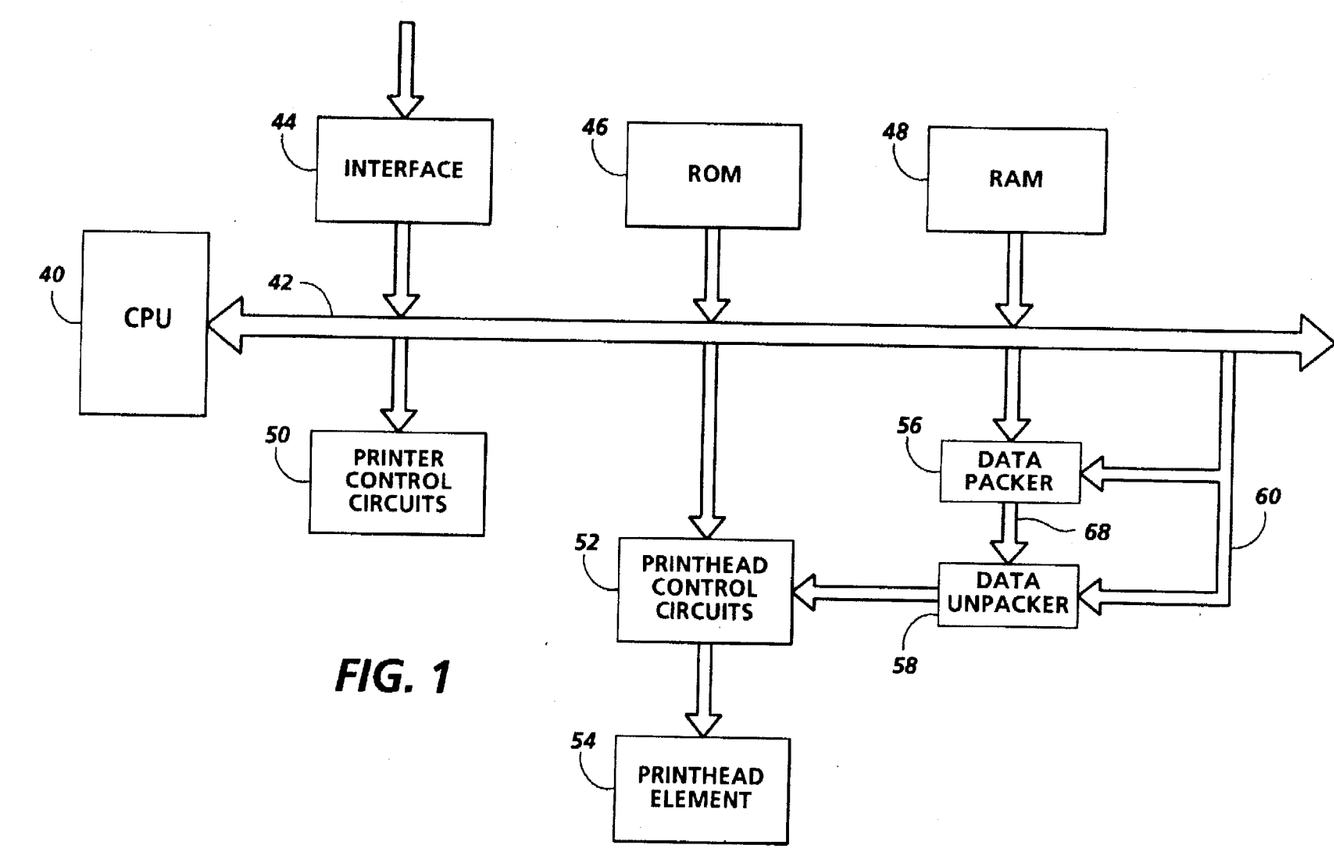
FIG. 1 is a block diagram of an electronic circuit for an ink jet printer incorporating odd/even stroke control for reduced video data clocking.

Referring to FIG. 1, there is shown a control system for an ink jet printer incorporating the present invention. A central processing unit or CPU 40 is connected through a bus 42 to an interface 44 which, in turn, is connected to an external device such as a host computer. The host computer provides information in the form of a bitmapped image to the printer for printing. The CPU 40 is also connected to a read only memory (ROM) 46 which includes an operating program for the CPU 40. A random access memory (RAM) 48 connected to the bus 42 includes accessible memory including print buffers for the manipulation of data and for the storage of printing information in the form of bitmaps received from the host computer. In addition to the ROM 46 and the RAM 48, various printer control circuits 50 are also connected to the bus 42 for operation of the printing apparatus which includes carriage driver circuits and paper feed driver circuits as is known by those skilled in the art.

The printhead 18 is also controlled by the central processing unit 40 according to the content of signals received over the bus 42 and sent to various printhead control circuits 52. The printhead control circuits 52 control the ejection of inks from the nozzles of a printhead element 54 contained in the printhead 18.

In addition to the printhead control circuits 52, a data packer circuit 56 is coupled to the bus 42. The data packer circuit 56 receives a vertical slice of the bitmapped imaged data which is typically stored in the RAM 48. Coupled to the data packer circuit 56 is a data unpacker circuit 58. The data unpacker circuit 58 is also coupled to the printhead control circuits 52. A control line 60 coupled to the bus 42 receives control information from the CPU 40 and is connected to both the data packer 56 and the data unpacker 58.

In the present invention, the vertical slice of bitmapped imaged data, also known as video data, is removed from its temporary storage location in the RAM 48 and every other bit in the vertical slice of bitmapped imaged data is removed by the data packer 56. This bitmap has not had a mask applied to it. This reduces the bit count by one-half if the vertical slice of bitmapped imaged data contains an even number of bits. Every other bit is removed by an electronic selection circuit 62 of the data packer 56, one embodiment of which is illustrated in FIG. 2.

Figure 2:
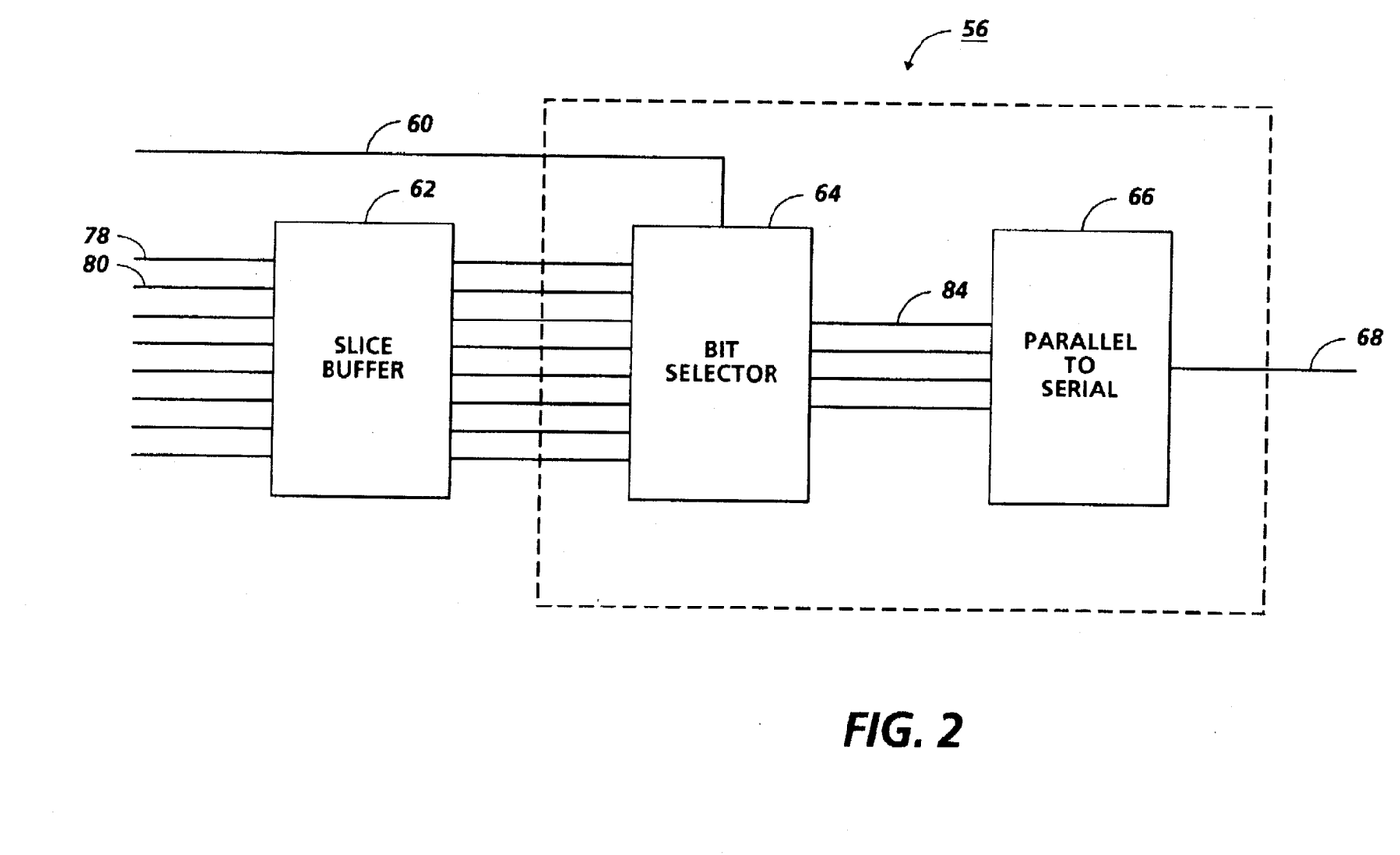
FIG. 2 is block diagram of an electronic selection circuit of a data packer circuit.

As illustrated in FIG. 2, it is presumed for the purposes of illustration that the vertical slice of bitmapped information contained in a slice buffer 62 typically residing in the RAM 48 stores eight bits of information from a single bit wide column of information retrieved from the bitmap. The eight bits of bitmapped information are passed to a bit selector 64 which selects certain bits contained in the slice buffer 62 according to a signal carried by the control line 60. The signal carried by the control line 60 causes the bit selector 64 to select every other bit contained in the slice buffer when printing in a checkerboard pattern as previously described. Consequently, the bit selector 64 includes four output lines since one-half of the information contained in the slice buffer 62 has now been deleted. This parallel information contained on the output lines of the bit selector 64 is sent to a parallel to serial logic circuit 66 which converts the parallel output of the bit selector 64 to serial information which is transferred over a serial information line 68. Each of these circuit elements illustrated in FIG. 2 is also coupled to timing lines (not shown) for controlling the timing of the circuitry as is understood by those skilled in the art.

As the print element 54 scans across the recording medium, adjacent vertical slices of data are manipulated and printed alternating between odd and even nozzles. For example, if the first swath 30 of FIG. 9 is printed, the first vertical slice of information in column 1 stored in the slice buffer 62 would contain the bits 1 through 8. Since only the odd bits are to be selected (bits 1, 3, 5, and 7) the logic control line 60 might pass a zero to the bit selector 64 so that only the odd bits are selected and transferred to the parallel serial logic circuit 66. This information is then sent to the data unpacker 58 over the line 68 (FIG. 1). After transmission of the first slice, a second slice of vertical information, here shown as the information in column 2, is selected. The control line 60 then carries a signal of a one (or high) so that only the even bits 2, 4, 6 and 8 are selected and sent through the parallel to serial logic circuit 66 and over the line 68. Using this scheme, the present invention transfers one-half the pixel information available in the slice buffer. By transferring one-half of the pixel information, the data clocking rate is reduced by one-half.

Figure 3:
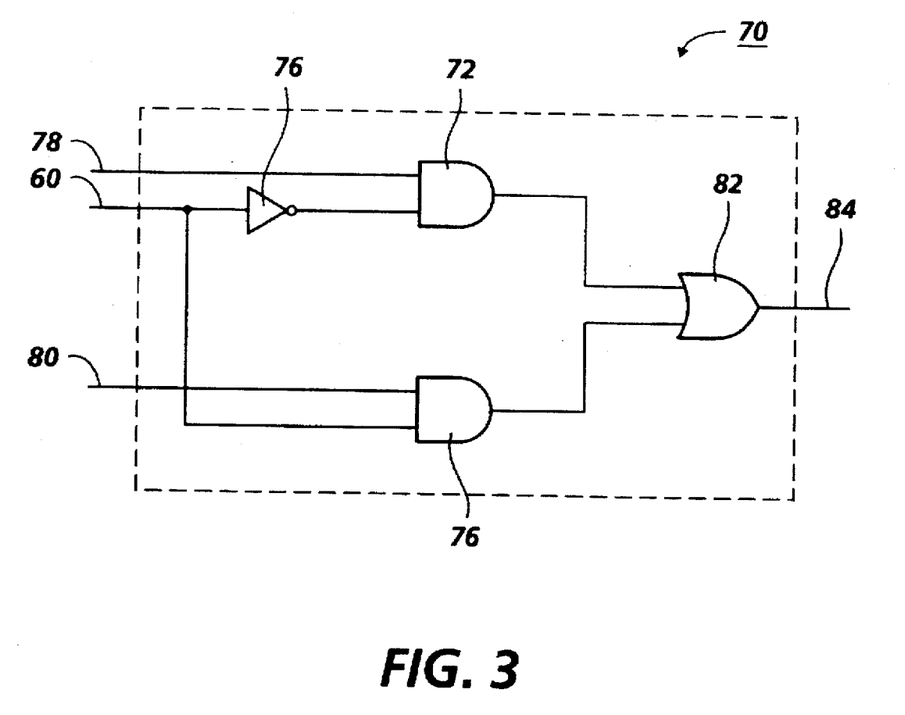
FIG. 3 is a circuit diagram of a selector circuit for use in the electronic selection circuit.

The bit selector 64 can be a two line to one line N bit wide data selector/multiplexer logic element in which N is the number of bits to be selected from the slice buffer 62. An example of such selector circuit 70 is illustrated in FIG. 3. The control line 60 is coupled to a first AND gate 72 through an inverter 74. The control line 60 is also coupled to a second AND gate 76. The first AND gate 72 also receives the first or topmost bit of information contained in the slice buffer 62 from a line 78 corresponding to the line 78 of FIG. 2. The second AND gate 76 receives a second bit in the column of bits stored in the slice buffer 62 along a line 80 corresponding to the line 80, also shown in FIG. 2. A NOR gate 82 receives the output of the first AND gate 72 and the second AND gate 76 to generate an output on a line 84 which corresponds to the line 84 of FIG. 2 and which carries one of the selected bits from the first of two bits held in the slice buffer 62.

The circuitry shown in FIG. 2 would typically be located in the ink-jet printer apparatus as opposed to the printhead which includes the printhead element 54, a portion of the printhead control circuits 52 and the data unpacker circuit 58.

Figure 4:
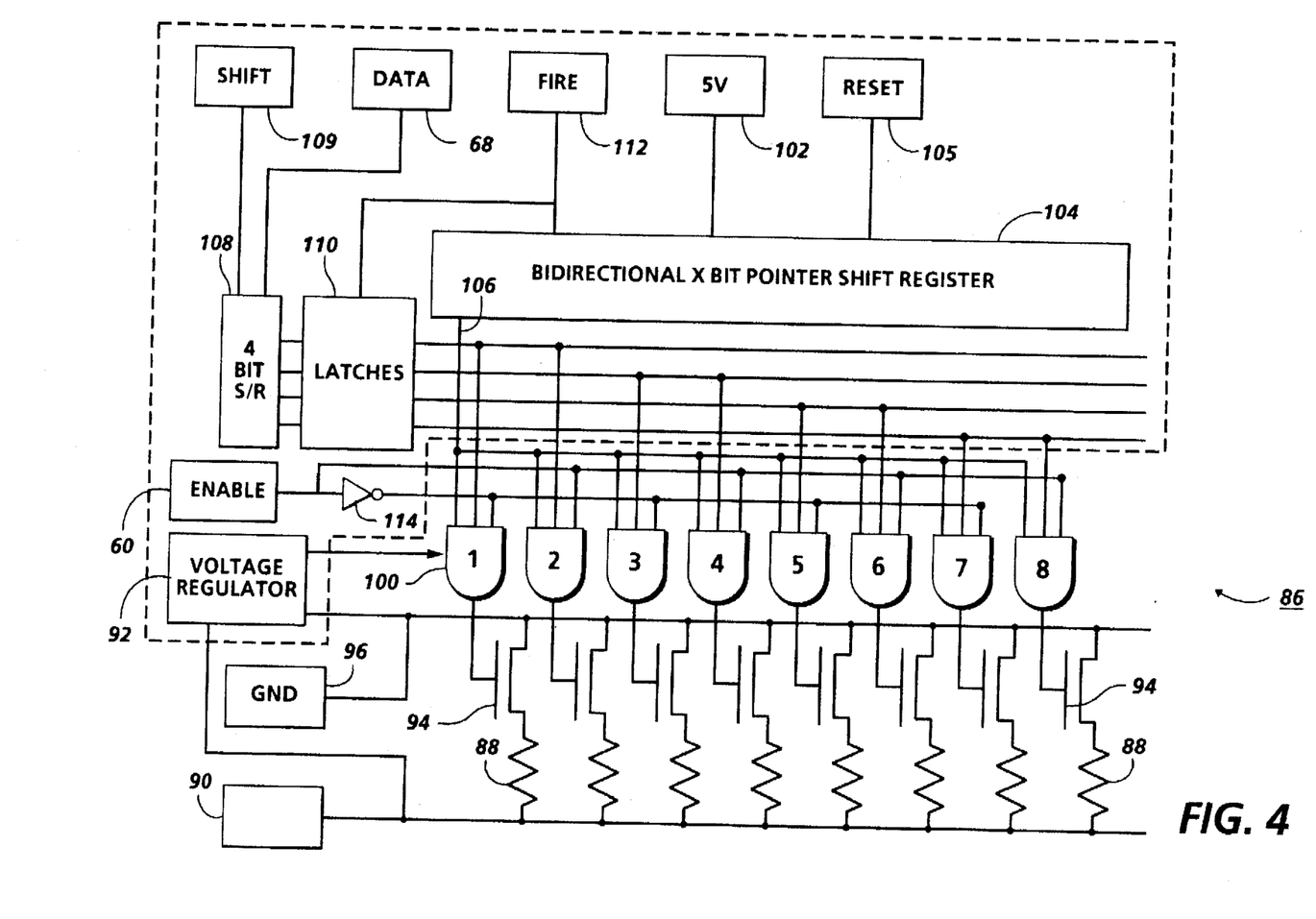
FIG. 4 is a circuit diagram illustrating one embodiment of an ink jet integrated circuit.

FIG. 4 is a schematic diagram illustrating the basic elements of a printhead integrated circuit used to selectively expel ink from the array of linearly aligned nozzles. In one particular embodiment, a thermal ink jet integrated circuit or chip 86 includes 192 thermal ink jet heating elements 88 which are powered by a 40 volt power supply line 90 available from the printer 9 (FIG. 8). A voltage regulator 92 regulates power received from the 40 volt power supply line 90. Each of the heating elements 88 is additionally coupled to a power MOS FET driver 94 having one side thereof coupled to a ground 96. The power MOS FET drivers 94 energize the heating elements 88 for expelling ink from the nozzles. The present invention is applicable to any number of ink jet heating elements 88, however, eight heating elements 88 are shown in FIG. 4 for illustrative purposes.

Selective control of each of the power MOS FET drivers 94 is accomplished by an AND gate 100 having the output thereof coupled to the gate of the driver 94. The voltage regulator 92 provides an output of greater than five volts and typically of 13 volts for supply to the AND gates 100. This operating voltage for the AND gates 100 enables the power MOS FET drivers 94 to be turned on harder through the application of a higher gate voltage than would be available from a five volt power supply 102 available from the printer 9. (FIG. 8)

To reduce the amount of circuitry necessary to individually fire each of the heaters 88, the thermal ink jet integrated circuit 86 controls up to eight heaters 88 at a time by using a bi-directional X-bit pointer shift register 104. Using this configuration, segments of the linear array of nozzles are sequentially fired as described in U.S. Pat. No. 5,300,968 the relevant portions of which are incorporated herein by reference. The length of the shift register 104 depends on the number of heaters 88 fired together and the total number of heaters 88 in the printhead itself. Since the present invention is being described with reference to a 192 nozzle ink-jet printhead, X is equal to 24 since eight heaters are controlled at a time.

Printing is initiated with a single one bit pointer which begins at the left most side of the shift register 104 at a line or conductor 106. The pointer bit starts at the left-hand side and propagates to the right-hand side or, in the alternative starts on the right-hand side and propagates to the left-hand side depending on the state of the data line 68 at the time a reset line 105 goes high. Bi-directional propagation of the single bit is necessary for bi-directional printing. When the shift register 104 is reset by the reset line 102, four bits of data received from the data line 68 are loaded into a four bit shift register 108. The four bit shift register 108 is shifted by a shift line 109 which receives shift information from the CPU 40 as understood by one skilled in the art. The four bits of data, which are then loaded into a four bit latch circuit 110, control whether or not an odd or even heating elements 88 corresponding to odd or even numbered AND gates 100 within a block of eight heating elements will be energized. A fire control pulse received from the printhead CPU 40 at a fire line 112, controls the amount of time that individual heaters 88 are energized. During the cycle of the fire control pulse, four new bits of information are loaded into the four bit shift register 108. The completion of the fire cycle advances the shift register 104 pointer bit one position and the fire cycle begins again. The latch 110 is used to latch the information from the four bit shift register 108 onto the individual MOS FET drivers 94 for energization.

Individual energization of each of the heaters 88 for printing a checkerboard pattern as illustrated in FIG. 9 is accomplished by an enable signal received over the control line 60 which selects either an odd or an even numbered AND gate 100. The combination of the enable signal 60 and the three input AND gates 100 comprise the data unpacker 58 for selectively addressing either the odd or the even heaters 88.

As illustrated in FIG. 4, every pair of odd and even AND gates are coupled to the same output line of the latch 110 so that the data is available at an odd and even AND gate. The enabling signal received over the control line 60 is coupled to the odd numbered AND gates 100 through an inverter 114. The even numbered AND gates are coupled to the control line 60 directly. When the enabling signal is a 0, the AND gates 1,3, 5, and 7 receive a 1 at the input so that the data available at the input to the AND gates from the latch 110 fires the appropriate heaters 88. When the control line 60 includes an enabling signal of a 1, the inputs at the even numbered AND gates are enabled so that these individual AND gates control their respective heaters 88. In this fashion, odd numbered heaters only or even numbered heaters only are selectively activated for checkerboard printing.

Figure 5:
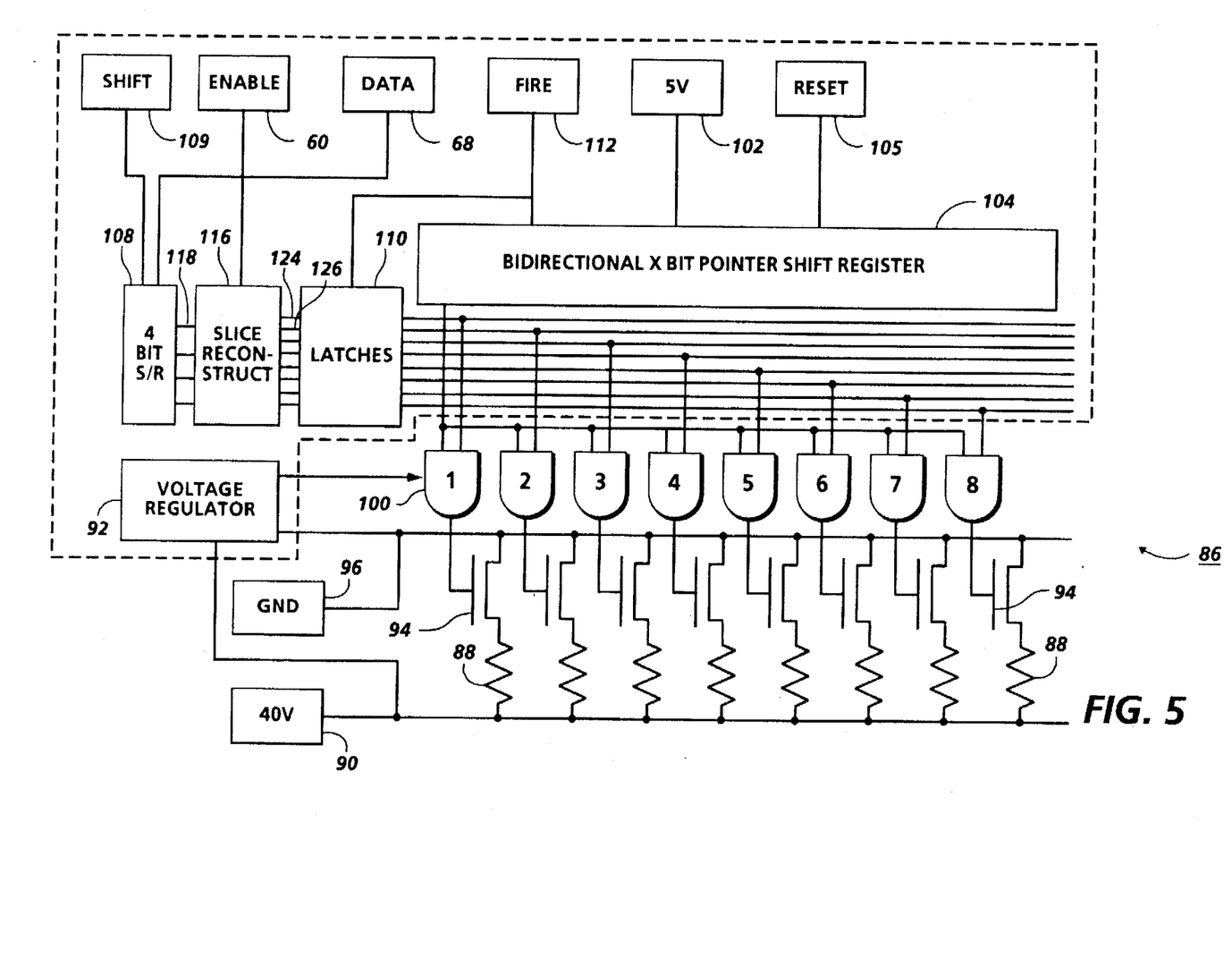
FIG. 5 is a circuit diagram illustrating another embodiment of an ink jet integrated circuit.

FIG. 5 illustrates a second embodiment of the integrated circuit chip 86 incorporating the present invention. In this particular embodiment data is sent over the data line 68 to the four bit shift register 108 as previously described. The output of the four bit shift register 108, however, is instead coupled to a slice reconstruction circuit 116 which inserts the data removed by the data packer 56. The slice reconstruction circuit is coupled to the enable line 60 which controls whether the four bits output from the four bit shift register 108 will be directed to odd or even and gates 100. If, for instance, the enable signal is a 0 it indicates that the four bits received from the four bit shift register 108 will be directed to the odd numbered AND gates. Consequently, the even and gates 2, 4, 6 and 8 should not fire a respective heater 88 and a 0 is inserted between each of the odd numbered bits by the slice reconstruction circuit 116. If, on the other hand, the enable signal is a 1, indicating that the four bits at the output of the four bit shift register are to be directed to the even numbered AND gates 100, then the slice reconstruction circuit 116 will insert a 0 on the odd numbered output lines.

Figure 6:
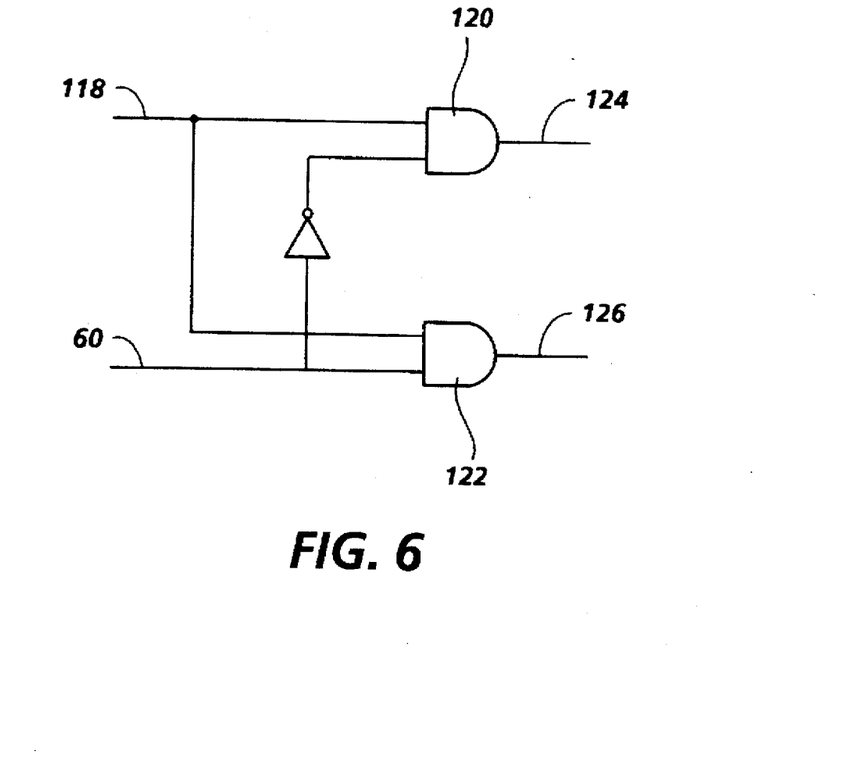
FIG. 6 is a circuit diagram of a portion of a bit slice reconstruction circuit.

A portion of the bit slice reconstruction circuit 116 is illustrated in FIG. 6 for directing a single input bit received from the four bit shift register 108 to one of two output lines of the circuit 116. For example, the top most bit of the four bit shift register 108 is input to a first line 118 of the slice reconstruction circuit 116. The enable line 60 is also coupled to the slice reconstruction circuit 116. A first AND gate 120 receives the input bit over the line 118 and the inverse of the enable signal over the line 60. A second AND gate 122 receives the first bit over the line 118 and the signal of the enable line 60. Depending on the state of the enable signal on the line 60, the first bit received from the four bit shift register on the line 118 will be directed to either the output of the first AND gate 120 or the output of the second AND gate 122 havinng output lines 124 and 126 respectively. In this fashion, one of the output lines 124 or 126 is driven according to the bit received from the four bit shift register while the other line is set to a 0 so that the appropriate odd or even AND gates 100 is not fired.

Figure 7:
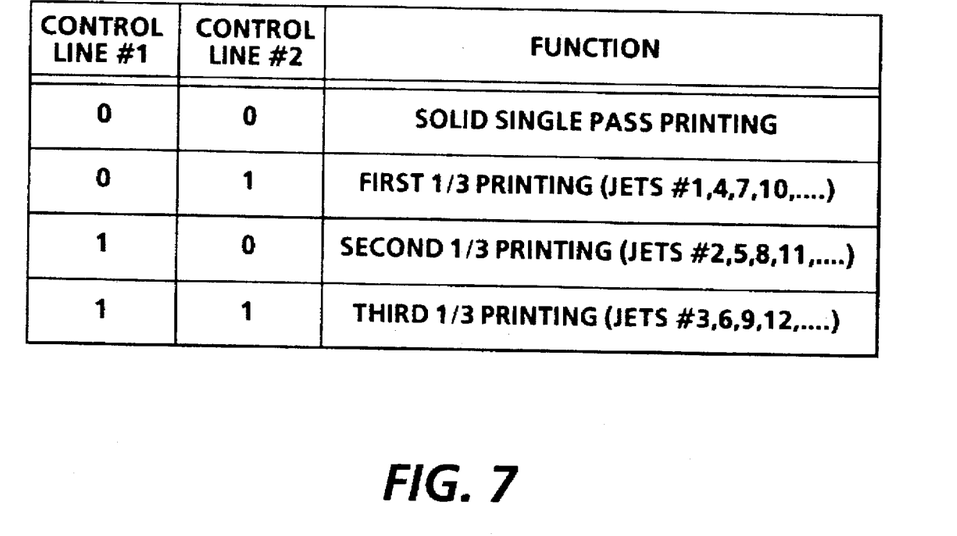
FIG. 7 is a functional description of control lines for use in the present invention if printing a checkerboard pattern in which three passes of a printhead are necessary to print a single swath of information.

The present invention reduces data rates by one-half for printing of checkerboard patterns in which every other bit in a column and every other bit in a row is not printed in a single pass. The present invention is also equally applicable to printing in which every third bit is printed in a single pass. Such printing, however, requires three passes of the printhead for full coverage. Using the proposed approach according to the present invention, however, two control lines as opposed to one would be required. The benefit here is that of reducing the data rate by two-thirds. FIG. 7 illustrates a possible implementation of the control lines. As seen in FIG. 7, every third bit is printed in a single column and the printed bits are changed for different columns in a print pass.

It is, therefore, apparent that there has been provided in accordance with the present invention, an odd/even stroke control for reduced data clocking in a liquid ink printing apparatus that fully satisfies the aims and advantages hereinbefore set forth. While this invention has been described in conjunction with a specific embodiment thereof, it is evident that many alternatives, modifications and variations will be apparent to those skilled in the art. For instance, the present invention is not limited to printheads which sequentially print segments of the printhead elements as described. The present invention can also be effectively used with printheads which print all the nozzles of the printhead at once. In addition, the detailed circuits illustrated in FIG. 3 and FIG. 6 are not the only circuits which can accomplish the proposed functions. Furthermore, the present invention is not limited to scanning printheads but is equally applicable to printers incorporating pagewidth printbars. Accordingly, the present invention is intended to embrace all such alternatives, modifications, and variations that fall within the spirit and broad scope of the appended claims.

What is claimed is:

1. A printing apparatus having a printhead with a plurality of drivers for causing liquid ink to be ejected from nozzles for printing an image on a recording medium according to a bitmap of image data including a plurality of bits arranged in rows and columns, the printing apparatus comprising:

selecting means for selecting a portion of the bitmap of image data with the selected portion having selected bits and unselected bits, the number of selected bits being less than the number of bits in the selected portion;

a logic control line coupled to said selecting means, said logic control line transmitting a control signal indicating which of the bits of the selected portion are selected;

directing means, coupled to said selecting means and to said logic control line, for directing the printhead to emit liquid ink from selected ones of the plurality of nozzles according to the selected bits in response to the control signal; and transfer means for transferring only the selected bits from said selecting means to said directing means.

2. The printing apparatus of claim 1, wherein said transfer means comprises a parallel to serial logic circuit coupled to a serial to parallel logic circuit.

3. The printing apparatus of claim 1, wherein said directing means comprises a driver selection means receiving the transmitted control signal and outputting a selection signal to selectively address only those drivers associated with the transferred selected bits.

4. The printing apparatus of claim 3, wherein the portion selected comprises a column of bits one bit wide and N bits high.

5. The printing apparatus of claim 4, wherein the bits selected comprise odd numbered bits in an odd numbered column.

6. The printing apparatus of claim 4, wherein the selected bits comprise even numbered bits in an even numbered column.

7. The printing apparatus of claim 4, wherein the selected bits comprise even numbered bits in an odd numbered column.

8. The printing apparatus of claim 4, wherein the selected bits comprise odd numbered bits in an even numbered column.

9. The printing apparatus of claim 1, wherein said directing means comprises a reconstruction means receiving the transmitted control signal and reconstructing the selected portion by inserting bits therein to indicate that no ink should be deposited at the inserted bit location.

10. A method for printing an image on a recording medium with a printhead having a plurality of nozzles according to a bitmap of image data having rows and columns, the method comprising:

selecting a portion of the bitmap of image data with the portion selected having selected bits and unselected bits, the selected portion including a column of bits one bit wide and N bits high;

controlling the selection of bits by a logic control signal indicating which of the bits of the portion selected are to be selected;

transferring only the selected bits in a serial fashion to the printhead; and directing the printhead to emit liquid ink from selected ones of the nozzles in response to the logic control signal.

11. The method of claim 4, wherein the selected bits comprise odd numbered bits in an odd numbered column.

12. The method of claim 4, wherein the selected bits comprise even numbered bits in an even numbered column.

13. The method of claim 4, wherein the selected bits comprise even numbered bits in an odd numbered column.

14. The method of claim 4, wherein the selected bits comprise odd numbered bits in an even numbered column.

15. The method of claim 10, wherein said selecting step comprises selecting the selected bits with a multiplexer logic circuit.

16. The method of claim 15, wherein said directing step comprises directing the selected bits with a demultiplexer logic circuit.

17. The method of claim 10, wherein said transferring step comprises transferring the selected bits with a parallel to serial logic circuit coupled to a serial to parallel logic circuit.

18. A printing apparatus having a printhead with a plurality of drivers for causing ink to be ejected from nozzles to print an image on a recording medium according to a bitmap of image data having rows and columns of bits, the printing apparatus comprising:

an electronic selection circuit receiving a portion of the bitmap of image data, including N bits, and outputting selected bits of the portion, the number of selected bits being less than N;

a logic control line coupled to said electronic selection circuit, said logic control line transmitting a control signal controlling the selection of the selected bits;

an electronic transfer circuit coupled to said electronic selection circuit, transferring only the selected bits of the selected portion; and an electronic control circuit, coupled to said electronic transfer circuit and to said logic control line, receiving the transferred selected bits and selectively addressing a portion of the plurality of drivers in response to the transmitted control signal received from said logic control line.

19. The printing apparatus of claim 18, wherein said electronic control circuit comprises a driver selection circuit receiving the transmitted control signal and outputting a selection signal to selectively address only those drivers corresponding to the transferred selected bits.

20. The printing apparatus of claim 19, wherein said electronic selection circuit comprises a multiplexer logic circuit.

21. The printing apparatus of claim 20, wherein said electronic transfer circuit comprises a parallel to serial logic circuit coupled to a serial to parallel logic circuit.

22. The printing apparatus of claim 19, wherein the selected portion comprises a column of bits one bit wide and N bits high.

23. The printing apparatus of claim 22, wherein the selected bits comprise odd numbered bits in an odd numbered column.

24. The printing apparatus of claim 22, wherein the selected bits comprise even numbered bits in an even numbered column.

25. The printing apparatus of claim 22, wherein the selected bits comprise even numbered bits in an odd numbered column.

26. The printing apparatus of claim 22, wherein the selected bits comprise odd numbered bits in an even numbered column.

27. The printing apparatus of claim 24, wherein said electronic control circuit comprises a reconstruction circuit, coupled to said electronic control line, reconstructing the portion by inserting bits therein to indicate that no ink should be deposited at the inserted bit location.

28. The printing apparatus of claim 27, wherein said electronic control circuit comprises a demultiplexer logic circuit.

* * * * *